(12) United States Patent
Sai et al.

(10) Patent No.: US 11,137,275 B2
(45) Date of Patent: Oct. 5, 2021

(54) ULTRASONIC FLOW METER WITH LENS COMBINATION

(71) Applicant: HONEYWELL INTERNATIONAL INC., Morris Plains, NJ (US)

(72) Inventors: Bin Sai, Zuid Holland (NL); Dong Luo, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 195 days.

(21) Appl. No.: 16/589,466

(22) Filed: Oct. 1, 2019

(65) Prior Publication Data

US 2020/0109977 A1 Apr. 9, 2020

Related U.S. Application Data

(60) Provisional application No. 62/742,032, filed on Oct. 5, 2018.

(51) Int. Cl.
*G01F 1/66* (2006.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| 4,387,720 A * | 6/1983 | Miller ................... | G10K 11/30 73/642 |
| 7,571,656 B2 | 8/2009 | Derevyagin et al. | |
| 8,505,391 B1 | 8/2013 | Baumoel | |
| 9,310,236 B2 | 4/2016 | Baumoel | |
| 2002/0007118 A1* | 1/2002 | Adachi ................... | G10K 11/30 600/443 |
| 2014/0208853 A1* | 7/2014 | Onishi .................. | B06B 1/0622 73/606 |
| 2016/0076923 A1 | 3/2016 | Baumoel | |
| 2018/0011211 A1* | 1/2018 | Leonard ............. | G01N 29/2456 |
| 2020/0258494 A1* | 8/2020 | Obi ......................... | G10K 11/02 |

FOREIGN PATENT DOCUMENTS

| EA | 200500319 | 10/2005 |
| GB | 2521661 | 7/2015 |
| RU | 2100780 | 12/1997 |
| SU | 1659717 | 6/1991 |
| WO | 1996024029 | 8/1996 |

* cited by examiner

*Primary Examiner* — Harshad R Patel
(74) *Attorney, Agent, or Firm* — Jetter & Associates, P.A.; Neil R. Jetter

(57) ABSTRACT

An ultrasonic flow meter includes a housing for attaching to a fluid pipe. A first piezoelectric element coupled to a transmitter and receiver is configured to emit ultrasonic waves in an axial direction perpendicular to a horizontal plane defined by the piezoelectric element. A lens combination is in a lower housing portion positioned radially outside the first piezoelectric element including a refocusing lens that is ring-shaped configured for redirecting received radial ultrasonic waves to travel in an axial direction perpendicular to the horizontal plane and has a thickness profile configured to act as a matching layer for reducing multiple reflections within the lower housing portion. A second lens that is disc-shaped below the refocusing lens is configured for redirecting the radial ultrasonic waves to travel in the axial direction.

18 Claims, 7 Drawing Sheets

ULTRASONIC FLOW METER WITH LENS COMBINATION

CROSS-REFERENCE TO RELATED APPLICATIONS

This application claims the benefit of Provisional Application Ser. No. 62/742,032, entitled "ULTRASONIC FLOW METER WITH REFLECTION REDUCING LENSES," filed Oct. 5, 2018, which is herein incorporated by reference in its entirety.

FIELD

Disclosed embodiments relate to ultrasonic flow meters.

BACKGROUND

Ultrasonic meters (USMs) are also known as Ultrasonic flow meters (UFMs) are becoming popular for fluid flow metering because of their capability to measure a wide range of different flow rates, cause minimal pressure drops, and have no-moving parts thus providing less mechanical maintenance and better reliability. A key hardware component in the USM is a piezoelectric element that comprises a piezoelectric crystal or a piezoelectric ceramic. As known in physics the Piezoelectric Effect is the ability of certain materials to generate an electric charge responsive to an applied mechanical stress.

For the application of flow metering two or more piezoelectric element-based transducers transmit and receive ultrasound signals through either a completely or partially encapsulated enclosure to and from fluids flowing in the pipe. There are the challenges of obtaining high ultrasonic signal quality and reliability which remain in industries such oil and gas. High pressure (gauge pressure) flow can reach 200 bar or more for industrial applications, while low and medium pressure is usually between 0.1 and 40 bar for commercial applications, such as being 1 to 20 bar.

Commercial and/or city gas distribution networks often face the issues of performance degradation when using conventional USMs at low and medium pressure, since the lower pressure is, the lower the density of the gas, and the higher the attenuation of ultrasonic signals. As a result, when USMs are operated at relatively low pressure there is a lower signal to noise ratio (SNR) and reduced detectability, reliability and/or stability of the USM. Currently turbine meters are the next best alternative (NBA) to USM's, but mechanical movements and a narrower turn-down ratio or measuring range make turbine meters difficult to serve commercial gas distribution markets predominantly because there may be a large difference between the high peak and the low valley of gas usage for businesses such as restaurants and hotels in cities where the velocity of gas (VoG) generally changes between 0.1 m/s and 25 m/s. Therefore, there is a high demand for USMs for city or commercial gas distribution networks.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize that in general, USM signal quality can be degraded by a plurality of different factors. These USM signal degrading factors include operational modes of the piezoelectric element, the surrounding housing (or enclosure) creating large amplitude and long-lasting ringing effects that can undermine useful signal detectability and system sensitivity. Ringing effects that last a long time increase the minimum measuring range (blind zone), which is recognized to be disadvantageous to short range measurements, especially in small size USMs, while matching and mismatching handling mechanisms cause signal loss and multiple reflections. Improper filling and backing materials can cause back coupling that increases the noise level, which reduces the SNR. Low or medium pressure of the fluid can cause severe attenuation effects of the signal amplitude, dust and dirt contamination on the piezoelectric transducer can cause a reduction in the SNR due to an increase in the noise level, and strong unwanted signals can saturate the receiver's low-noise amplifier (LNA) used to amplify the generally weak received ultrasonic signals.

Disclosed USMs have features that can generally address all these USM signal quality degrading factors described above in one design with an emphasis on the being configured for the relatively more difficult application to low and medium pressure fluid flow sensing which as noted above is generally between 0.1 and 40 bar, since high-pressure applications can or less difficult because of the enhancement in the receive signal quality due to a lower attenuation/damping effect. As a result, conventional high-pressure transducer designs in general will not fit for such low and medium pressure applications in terms of signal quality, especially for compressible fluids such as natural gas that can cause considerable attenuation/damping on signals travelling through it, so that the transducer paths will not work properly, resulting in low signal quality or the failure of the USM's flow measurements.

Disclosed aspects include an ultrasonic flow meter that includes a housing including an upper housing portion and a lower housing portion for attaching to a fluid pipe. A piezoelectric element coupled to a transmitter and receiver is configured to emit ultrasonic waves in an axial direction perpendicular to a horizontal plane defined by the piezoelectric element. A lens combination is in a lower housing portion that includes a refocusing lens positioned radially outside the first piezoelectric element that is ring-shaped which is configured for redirecting received radial ultrasonic waves to travel in the axial direction, and has a thickness profile configured to act as a matching layer for reducing multiple reflections within the lower housing portion. A second lens that is flat disc-shaped is below the refocusing lens that includes an outer portion that is radially outside the first piezoelectric element which is configured for redirecting the radial ultrasonic waves to travel in the axial direction.

DETAILED DESCRIPTION

Figure 1A:
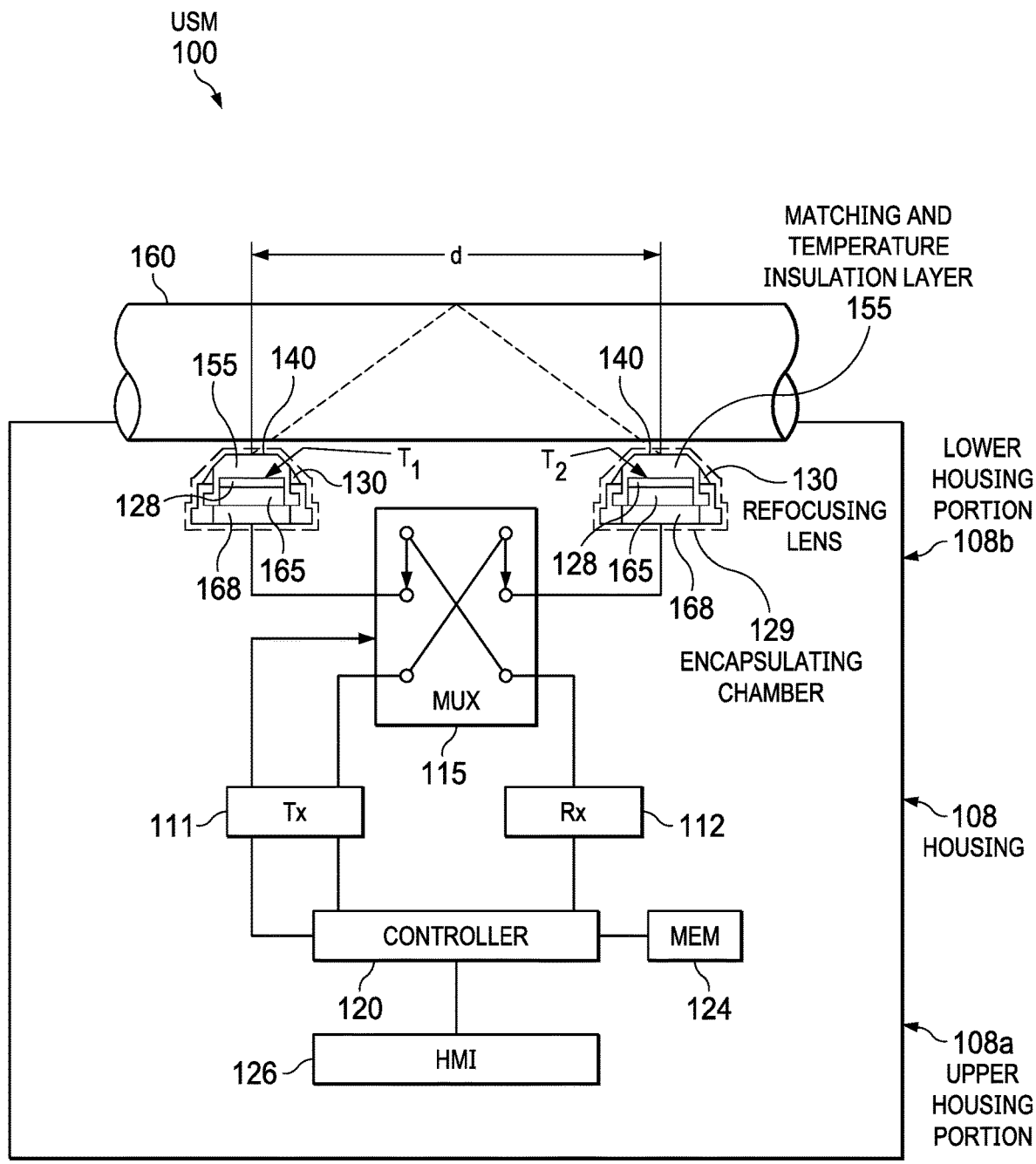
FIG. 1A is block diagram depiction of an example USM installed for flow measurements of a fluid flowing in a pipe, where the USM includes a first and second piezoelectric elements that implement indirect path (reflective path) sensing, according to an example embodiment.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Figure 2A:
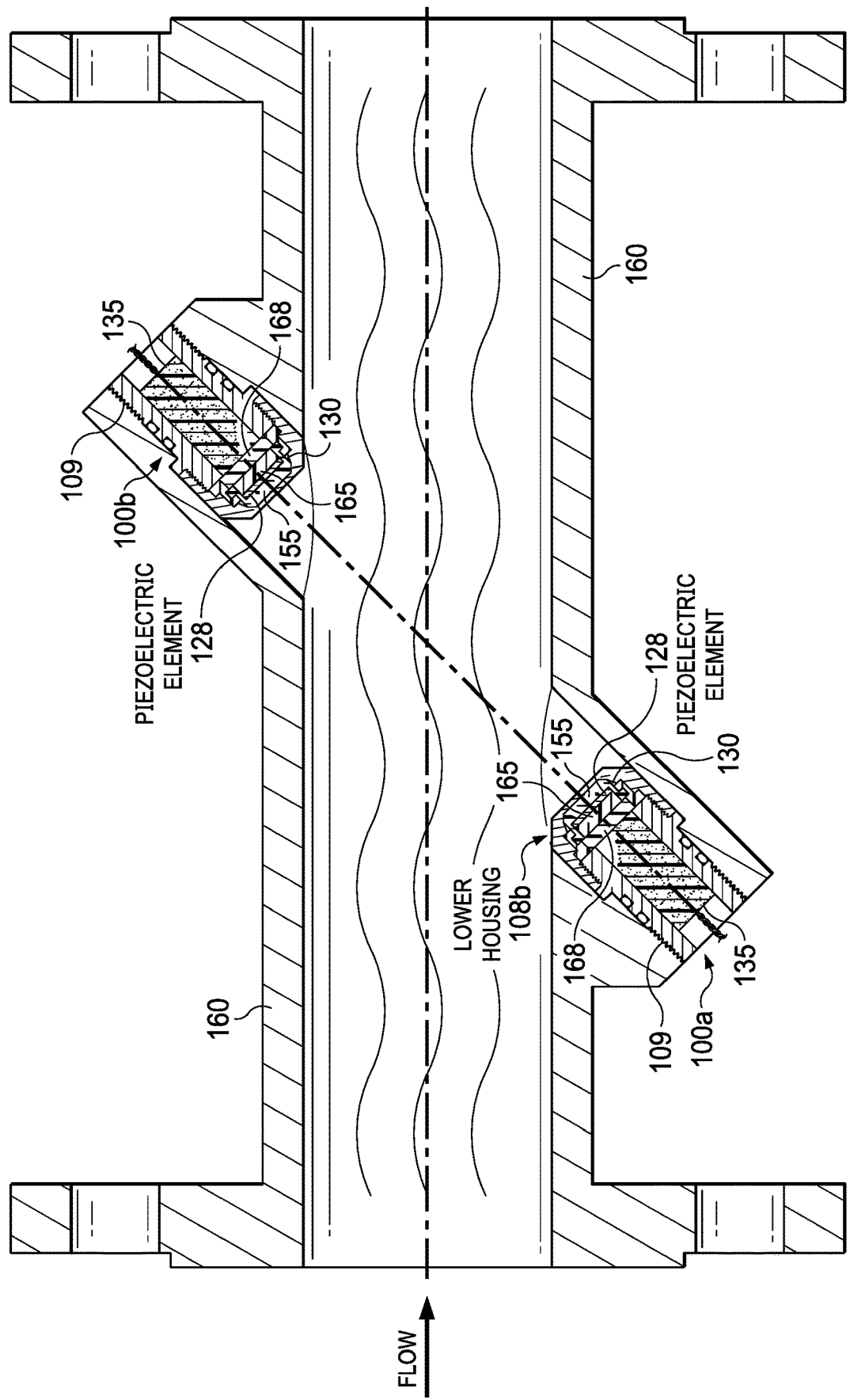
FIG. 2A shows a direct path configuration implemented with a first USM having a first piezoelectric element and a second USM having a second piezoelectric element, where the respective USMs are located on the opposite sides of a pipe, with a face of the respective piezoelectric elements pointing towards one another.

FIG. 1A is block diagram depiction of an USM 100 that includes at least the disclosed lens combination comprising the refocusing lens 130 and the second lens 140, and generally also includes a plurality of the other above-described features for overcoming USM signal quality degrading factors, which is installed within a meter body for ultrasonic-based flow measurements of a fluid flowing in a section of a pipe 160. The USM 100 is shown including an outer housing 108 also known as an enclosure providing a meter body with a piezoelectric element pair shown therein comprising a first piezoelectric element shown as $T_1$ and a second piezoelectric element $T_2$ on the same side of the pipe 160 that are spaced apart from one another by a distance shown as d, that implements a reflective path (indirect path) sensing configuration. Disclosed USM's may also have only a single piezoelectric element, such as shown in FIG. 2A described below. The housing 108 can comprise brass, titanium, or an aluminum alloy. such as aluminum 6061 which includes magnesium and silicon as its major alloying elements.

Figure 2B:
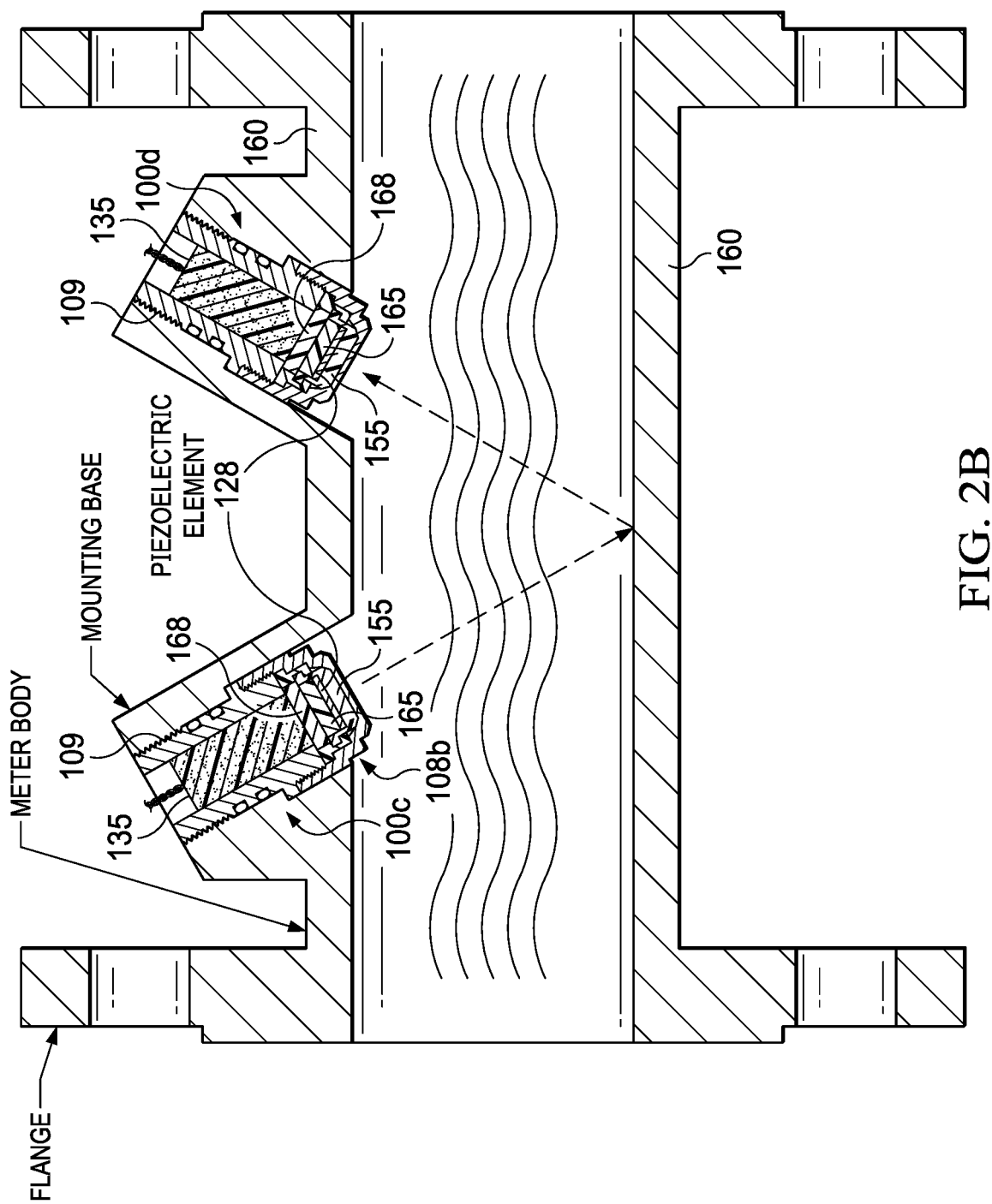
FIG. 2B shows an indirect path configuration with a first USM having a first piezoelectric element and a second USM having a second piezoelectric element, where the respective USMs are located on the same side of the pipe.

Although the USM 100 is shown implementing a reflective path sensing configuration, a direct path configuration shown in FIG. 2A can also be implemented where there is a first USM 100a having a first piezoelectric element and a second USM 100b having a second piezoelectric element, where the respective USMs are instead located on the opposite sides of the pipe 160, with a face of the respective piezoelectric elements 128 pointing toward one another. As known in the art, the piezoelectric elements 128 generally have a disc-shape, that being flat, thin circular objects, that can be considered because of their thin nature providing a horizontal plane which in the USM is in the radial direction, that is perpendicular to the actual direction in which the ultrasonic wave is emitted by the USM. The reflective (indirect) path configuration in FIG. 2B is shown implemented with a first USM 100c having a first piezoelectric element 128 and a second USM 100d having a second piezoelectric element 128, where the respective USMs are now located on the same side of the pipe 160.

The USM 100 is attached to the pipe 160, generally either being inserted into the pipe 160 using a gas tight and high-pressure resistant mechanism, or configured as a clamp-on device installed on the outside of the pipe 160. Although not shown in FIG. 1A, the piezoelectric elements $T_1$ and $T_2$ may each have their own separate encapsulation chamber (see the inner encapsulated (isolated) chamber 129 shown in FIG. 3 described below that encapsulates the piezoelectric element, and is shown also encapsulating the refocusing lens 130.

The piezoelectric elements $T_1$ and $T_2$ employ piezoelectric crystals or piezoelectric ceramics that are set into vibration when a pulsed voltage signal (receipt from a transmitter) is applied to their piezoelectric element, thereby generating ultrasonic waves. In operation, ultrasonic pulses are alternately transmitted by one of the piezoelectric elements of the pair and are received by the other piezoelectric element of the pair needed for the flow measurement.

An angled axial signal path is shown in FIG. 1A by the dashed line inside the pipe 160. As known in the art, the USM can include more than the 2 piezoelectric elements $T_1$ and $T_2$ shown in FIG. 1A, typically from two up to 16 piezoelectric elements. USM 100 includes a transmitter (Tx) 111 and a receiver (Rx) 112, or as an alternative to the separate Tx and Rx as shown there can be a single transceiver, coupled to $T_2$ and $T_1$ respectively by a digitally controlled multiplexer (MUX) 115 that enables the piezoelectric elements $T_2$ and $T_1$ to swap (alternate) transmit and receive roles so that in one moment, Tx 111 is on and the Rx 112 is on another moment. The pipe 160 in operation has a fluid therein, being a liquid or a gas, such as natural gas. The fluid can be at a low pressure or a medium pressure that is usually between 0.1 and 40 bar, such as 1 to 20 bar.

The USM 100 generally also includes a controller 120, generally comprising a microprocessor, digital signal processor (DSP), or a microcontroller unit (MCU), that has an associated memory shown as 'MEM' 124 that can store code for algorithms including algorithms for implementing disclosed fluid velocity measurement methods. The controller 120 is coupled to the Tx 111 and the Rx 112, and is also coupled to control the MUX 115. The controller 120 also is configured to switch the Tx and Rx roles in designated timing intervals.

However, as known in the art, algorithms run by the controller 120 may be implemented by hardware and/or be implemented by software. Regarding hardware-based implementations, algorithm equations can be converted into a digital logic gate pattern, such as using VHDL (a Hardware Description Language) that can then be realized using a programmable device such as a field-programmable gate array (FPGA) or complex programmable logic device (CPLD), or a dedicated application-specific integrated circuit (ASIC) to implement the logic gate pattern. Regarding software-based implementations, code for the algorithm is generally stored in a memory such as memory 124 that can be implemented by the controller 120.

There is also a human-machine interface (HMI) 126 shown in FIG. 1A coupled to the controller 120 that may include a keyboard and a display if deemed needed. An operator can use the HMI 126 to adjust operating parameters of the USM.

Figure 1B:
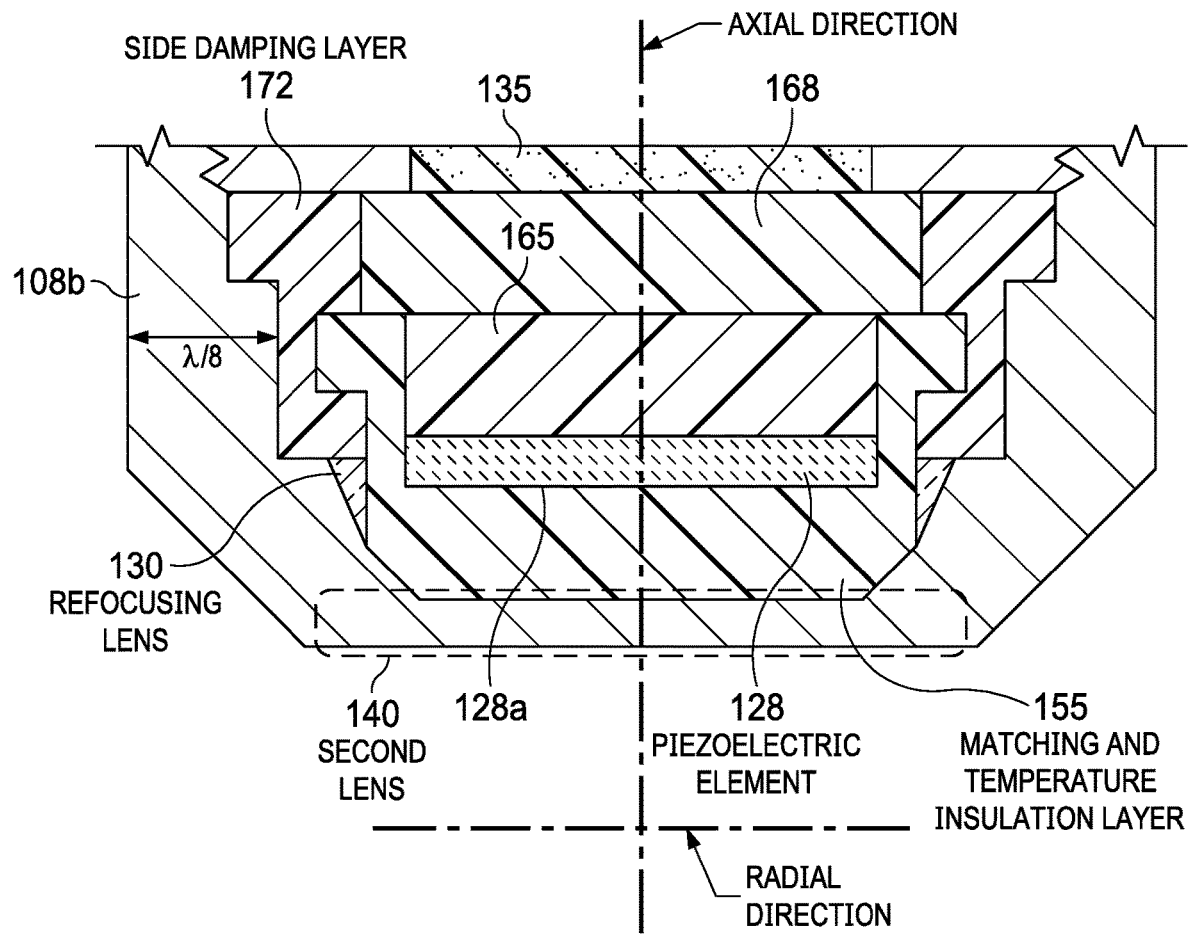
FIG. 1B shows an example arrangement of a disclosed refocusing lens and second lens relative to the piezoelectric element inside a lower housing portion.

The USM 100 also includes a disclosed lens arrangement that can be a better seen in FIG. 1B described below, where the piezoelectric element is now shown as 128. FIG. 1B is a cut-away view that shows an example arrangement in the lower housing portion 108b showing a disclosed refocusing lens 130 and a disclosed second lens 140 that generally comprises a bottom section of the lower housing portion 108b, and how they are positioned relative to one another and relative to the piezoelectric element 128. An axial direction and a radial direction are both shown. The radial direction is the same direction as the horizontal plane defined by the piezoelectric element 128, where the piezoelectric element 128 as noted above is generally disc-shaped.

FIG. 1B also shows back filling and damping materials 135 on top of the damping and canceling layer 168, a matching and temperature insulation layer 155 below and on the sides of the piezoelectric element 128, and side damping 172 including between the lower housing portion and the matching and temperature insulation layer 155 and damping and canceling layer 168.

The lens arrangement comprises a refocusing lens 130 and a second lens 140, that are both positioned in the lower housing portion 108b, where the refocusing lens 130 is radially outside the first piezoelectric element 128, and an outer portion of the second lens 140 is radially outside the first piezoelectric element 128. The second lens 140 is generally disc-shaped, generally being a solid disk, and is positioned below the refocusing lens 130, where the ultrasonic signal is transmitted (e.g., emitted and optionally also received) through the inner portion the second lens 140.

As known in the art, during USM 100 operation when the piezoelectric element 128 vibrates, both p-wave and s-wave are produced with an inflection slope including in the radial direction. The refocusing lens 130 is configured for redirecting the radial ultrasonic waves from the first piezoelectric element 128 to provide a diffraction or inflection to redirect these radial ultrasonic waves in the axial direction for reducing a signal loss.

As known in acoustics, the thickness of a matching layer is usually equal to one quarter of the sound wavelength ($\lambda/4$), to minimize the reflection at the front side of the matching layer, in favor of transmitted waves. Having found an optimum impedance value, the next determination is for finding a material having that particular impedance. One can use the known Mason Model which is a is a theoretical matching layer modeling algorithm. It is also possible to find the most suitable thickness by using a computer numerical simulation or comparative tests.

The second lens 140 is also for redirecting the radial ultrasonic waves it receives to travel more directionally in the axial direction. The nominal center diameter of the second lens 140 is generally $\lambda/2$, that can generally be ±20%, and the nominal thickness for the second lens 140 is as also with the refocusing lens 130 generally determined by acoustic impedance matching considerations to provide a matching layer. The second lens 140 may have a nominal thickness of $\lambda/20$ that can generally be ±20% to provide an impedance matching layer which was determined to be the best acoustic matching thickness according to the results of a comparative test performed by the Inventors for a particular set of operating conditions.

With the diameter of the second lens 140 being disc surface that utilizes the bottommost part of the housing specified to generally be about $\lambda/2$, as well as its thickness to be about $\lambda/20$, with these two defined geometrical parameters, the bottommost part of the housing acts as a lens to redirect acoustical waves that are received in the USM, such as where the same piezoelectric elements are alternating as transmitter or receiver in a pair. The bottommost flat surface of the housing thus provides an additional new function as an acoustic lens.

As known in the art, during operation when the piezoelectric element 128 is controlled to vibrate, both p-wave (also known as compressional waves) and s-wave (also known as secondary waves) are produced with an inflection slope including in the radial direction, where resonances can occur when the radial spacing (the outer diameter of the piezoelectric element 128 to the inner wall of the lower housing portion 108b) is too tight, so that standing waves can be created.

The refocusing lens 130 is generally ring-shaped with a right-angled triangle (cross-section (see FIG. 1B described below) and is configured to redirect received ultrasonic waves away in the axial direction which as described above is perpendicular to horizontal plane of the piezoelectric element 128, so that standing acoustic waves are not created. Specifically, an inflection slope and diffraction/inflection of the received radial ultrasonic waves provided by the refocusing lens 130 is for overcoming acoustic impedance mismatching with the housing which generally comprises a metal or metal alloy to a gas such as air, natural gas, or nitrogen, which has a large difference in impedance as compared to the temperature insulation layer 155 which is shown positioned between the piezoelectric element 128 and the refocusing lens 130 and the second lens 140.

Regarding flow velocity measurement, acoustic pulses from the piezoelectric elements $T_1$ and $T_2$ are crossing the pipe 160 like a ferryman crossing a river. Without fluid flowing in the pipe 160, acoustic pulses propagate with the same speed in both directions. If the fluid in the pipe 160 has a flow velocity different from zero, acoustic pulses travelling downstream (from $T_1$ to $T_2$) with the fluid flow will move faster, while those travelling upstream (from $T_2$ to $T_1$) against the fluid flow will move slower. Thus, the downstream travel times "$t_{AB}$" will be shorter, while the upstream travel times ones "$t_{BA}$" will be longer as compared when the fluid is not moving. Time of flight (TOF) which herein refers to directly measuring the travel time of the signal, or indirect measurement methods such as Tx signal-based system cross-correlation or post-processing based cross-correlation can also be used to determine the travel time. The equations below illustrate the computation principle, representing the travel time, and velocity of the fluid and velocity of sound in the fluid as a function of the path length and angle of the path relative to the pipe 160.

$$t_{ABn} = \frac{L_n}{c_n + v_n \cos\varphi_n} \quad (1)$$

$$t_{BAn} = \frac{L_n}{c_n - v_n \cos\varphi_n} \quad (2)$$

$$v_n = \frac{L_n}{2\cos\varphi_n} \cdot \left(\frac{1}{t_{ABn}} - \frac{1}{t_{BAn}}\right) \quad (3)$$

$$c_n = \frac{L_n}{2} \cdot \left(\frac{1}{t_{ABn}} + \frac{1}{t_{BAn}}\right) \quad (4)$$

where: $t_{ABn}$ is the downstream travel time of path n between piezoelectric element $T_1$ shown in the equations as A and piezoelectric element $T_2$ shown in the equations as B.

$t_{BAn}$ is the upstream travel time of path n between piezoelectric elements A and B.

$L_n$ is the straight line length of the acoustic path n between the two piezoelectric elements $T_1$(A) and $T_2$(B).

$\varphi_n$ is the angle of path n relative to the pipe.

$v_n$ is the uncorrected raw velocity of fluid measured by piezoelectric elements of path n.

$c_n$ is the velocity of sound in the fluid measured by piezoelectric elements of path n.

Figure 3:
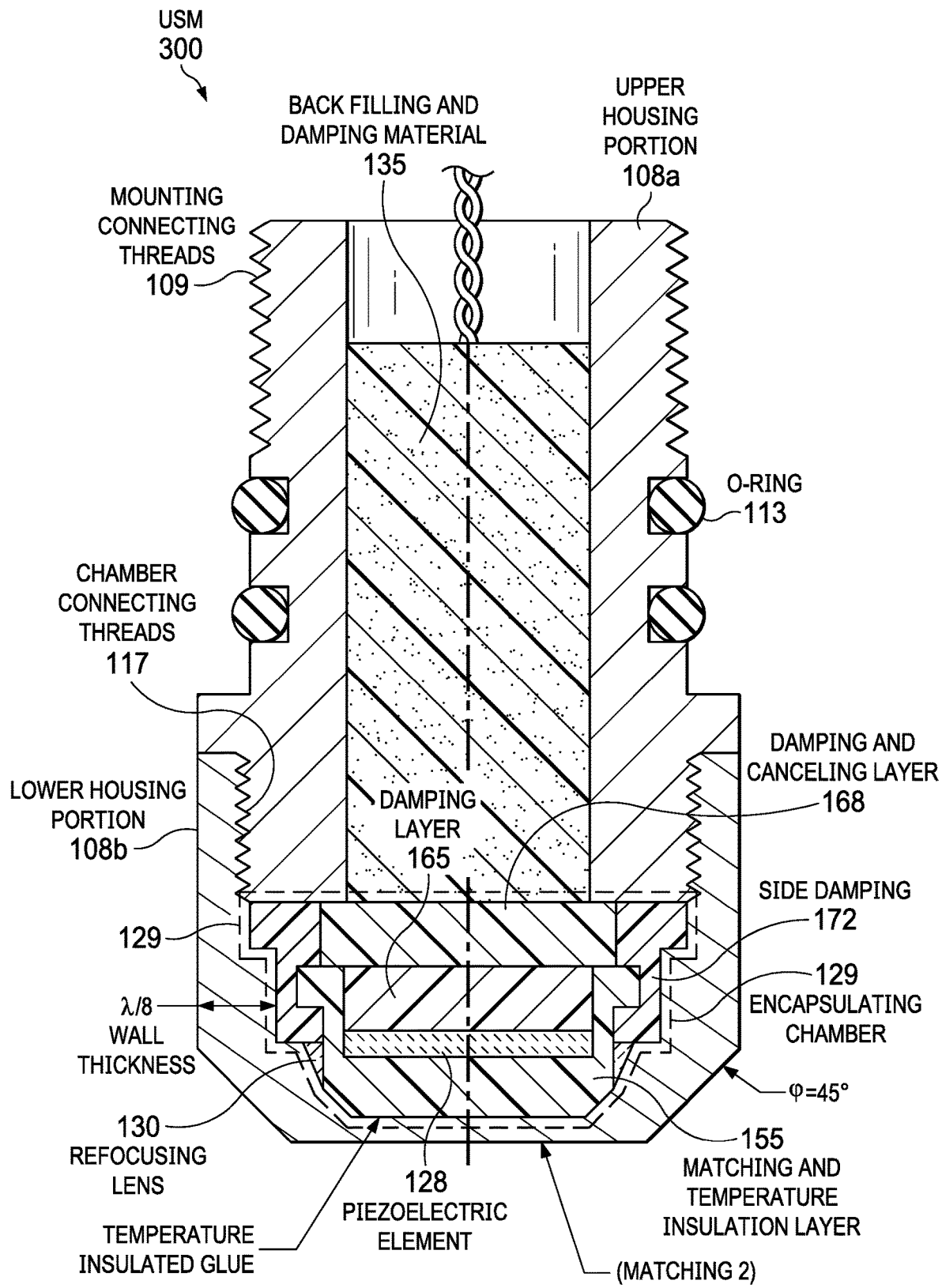
FIG. 3 shows a cut-away view of an example USM having a refocusing lens and a half-wavelength lens, according to an example embodiment.

FIG. 3 shows a cut-away view of an example USM 300 having a disclosed refocusing lens 130 and a second lens 140, according to an example embodiment. The operating wavelength for the USM is generally in a range from 10 mm to 30 mm. The outer housing 108 is as in FIG. 1A shown in FIG. 3 having an upper housing portion 108a attached to a lower housing portion 108b. Chamber connecting threads 117 are shown in FIG. 3 coupling the upper housing portion 108a to the lower housing portion 108b. The housing 108 being configured as separate upper housing portion 108a and lower housing portion 108b reduces the amount of bubbles introduced when filling materials generally added in liquid form such as the damping layer 165, damping and canceling layer 168, and backfilling and damping material 135 are added to the inside of the housing 108 using a conventional long tube, difficulty in filling the inside of the housing 108 in production, and further to be able to adjust the joint in the air space (air interface) between the upper housing portion 108a and lower housing portion 108b to mitigate undesirable back coupling of signals from the front to the back of the USM 300 and then to the front-again.

The housing 108 can comprise a metal material or a non-metallic material. The upper housing portion 108a has an attachment feature shown as mounting connecting threads 109 for attaching to a pipe having a fluid herein. Regarding terminology, the top of the USM 300 is the side of the USM with the threads 109 as shown in FIG. 3 with the O-ring 113 under the threads 109 that is on an opposite side relative to the piezoelectric element 128, while the bottom of the USM 300 is the end with the piezoelectric element 128 that is the front-acoustic active end for the wanted acoustics transmitting and receiving direction, where the bottom of the USM 300 (front-end) is designed to be positioned down inside the pipe of the meter body as shown in FIGS. 2A and 2B. The piezoelectric element 128 is shown in the lower housing portion 108b. However, the piezoelectric element 128 can also be in border region between the upper housing portion 108a and the lower housing portion 108b. The piezoelectric element 128 is coupled to a transceiver (Tx 111/Rx 112) as shown in FIG. 1 that may be within an electronics housing (not shown) together with a controller 120.

Above the piezoelectric element 128 is a damping layer 165 that generally comprises a material with low density such as a porous foam or a polymer with a damping and cancelling layer 168 that also generally comprises a material with a low density such as porous foam or a polymer. The layer thickness of the damping layer 165 is generally about $\lambda/2$ in an axial direction backward direction towards upper housing portion 108a. The piezoelectric element 128 is surrounded by a matching and temperature insulation layer 155 that generally comprises a composite material having a low thermal conductivity, such as an epoxy glass, or a thermoplastic compound foam. There is also a side damping layer 172 outside the damping and the cancelling layer 168 and over the matching and temperature insulation layer 155 portion over the piezoelectric element 128 and the damping layer 165.

The refocusing lens 130 is configured according to piezoelectric element's 128 vibrational mode as well as the arrangement of the piezoelectric element 128 in the housing (the lower housing portion 108b). The refocusing lens 130 is shown in the triangular space between the matching and temperature insulation layer 155 and the lower housing portion 108b, and can comprise an adhesive epoxy resin mixed with hardener for filling the gap between metal lower housing 108b and matching and temperature insulation layer 155. The filling material using an adhesive compound not only bonds two different material without voids, but also seals the gap with a designated shape so that the refocusing lens 130 can be formed in the gap.

The refocusing lens 130 which as noted above can be shaped as a right-angled triangle, can provide an angle of the hypotenuse which is generally greater than or equal to 20 degrees, defined by the gap present in the structure, and the center width (thickness) is about $\frac{1}{50}$ wavelength, which is a relatively small thickness, typically less than 1 mm. As a result, most of the ultrasonic signals leaked towards the side of the USM 300 between refocusing lens 130 and $\lambda/8$ wall of the lower housing portion 108b will be reflected by the refocusing lens 130, and a $\lambda/8$ thick housing wall to not interfere with the signal going forward at the bottom of the USM 300 that is its acoustically active front-end.

Also shown in FIG. 3 is an inner encapsulating chamber 129 that encapsulates the piezoelectric element 128, that is also shown encapsulating the refocusing lens 130. The second lens 140 generally a portion (the bottom part) of the housing is outside of the encapsulating chamber 129.

The refocusing lens 130 orientation is generally ring-shaped and positioned radially outside the piezoelectric element 128, but lower in the lower housing portion 108b relative to the piezoelectric element 128, while the second lens 140 is generally below the refocusing lens 140. The second lens 140 as noted above is generally an area of the lower housing portion 108b and is not a separate component. This housing area for providing second lens 140 can be disc-shaped with a nominal center diameter of $\lambda/2$ and a thickness of about $\lambda/20$. The refocusing lenses 130 and the second lens 140 are thus configured so that reflected and refracted ultrasonic waves from its own acoustics are directed and/or redirected in the axial direction toward the fluid medium in the pipe, where the so-called mismatching of acoustic impedance of different media is known to cause undesirable reflection back to piezoelectric element 128.

The angle of 45 degrees (set by the housing wall above the second lens 140 as shown in FIG. 3) thus does not interfere with the signal transmitted by the piezoelectric element 128 from the lower housing portion 108b being the front-acoustic active end of the USM 300 by redirecting lateral waves to the front-acoustic active end to avoid multiple reflections within the relatively small space and for cancelling standing resonance waves. The refocusing lens 130 is configured for cancelling leakage of ultrasound waves reaching to the wall of the housing was generally comprises a metal where the impedance discontinuity is more severe at the outer surface of the lower housing. This mismatching can further create multiple reflections (a standing wave) between the region of the piezoelectric element 128 and the refocusing lens 130. Accordingly, the λ/8 housing wall thickness is meant to suppress standing waves in that space to enhance the axial ultrasonic waves from the piezoelectric element 128.

As noted above the second lens 140 can be λ/2±20% in center diameter of its disk shape, where as noted above λ is the wavelength of the ultrasound signal used in the sensing application, such as 10 mm to 30 mm. The material for second lens 140 generally being a portion of the lower housing portion can comprise a metal or a non-metal, but will generally be a metal such as stainless steel or titanium that is recognized to be a housing material that is well adapted for harsh environment conditions. The outer area of the second lens 140 shown in FIG. 1B reduces the radial ultrasonic wave propagation (i.e., cancels them with a phase reversal) perpendicular to the axial direction and suppresses sidelobes to make the ultrasonic wave travel more directionally, in the axial direction.

The refocusing lens 130 and second lens 140 are generally partial concentric with one another with the second lens 140 extending radially outside the refocusing lens, and is at least partially below the refocusing lens 130 generally shown completely below the refocusing lens 130. As noted above, the piezoelectric element 128 is typically disc-shaped, and the refocusing lens 130 is a generally a right triangle shaped ring radially outside of the piezoelectric element 128, and as described above second lens 140 is generally a section of the lower housing portion 108b that is typically disc-shaped and is positioned below the piezoelectric element 128 relative to the piezoelectric element's 128 front face 128a.

Lens materials for the refocusing lens 130 and the second lens 140 are generally selected that are applicable to low and medium pressure conditions which as noted above is up to 40 bar, which should not be too soft to enable withstanding pressure conditions. For example, titanium, SS304, 316, aluminum alloys, or non-metallic material such as plastics may be used, depending on the requirements of fluid measurement conditions, e.g., corrosive or dust. That is the reason the ¼λ matching layer shown as matching and temperature insulation layer 155, and the refocusing lens 130 are configured to redirect the sidelobe ultrasonic waves to the front of the USM 300 and suppress multiple reflections that can take place within the generally metallic rigid housing 108a, 108b.

Figure 4:
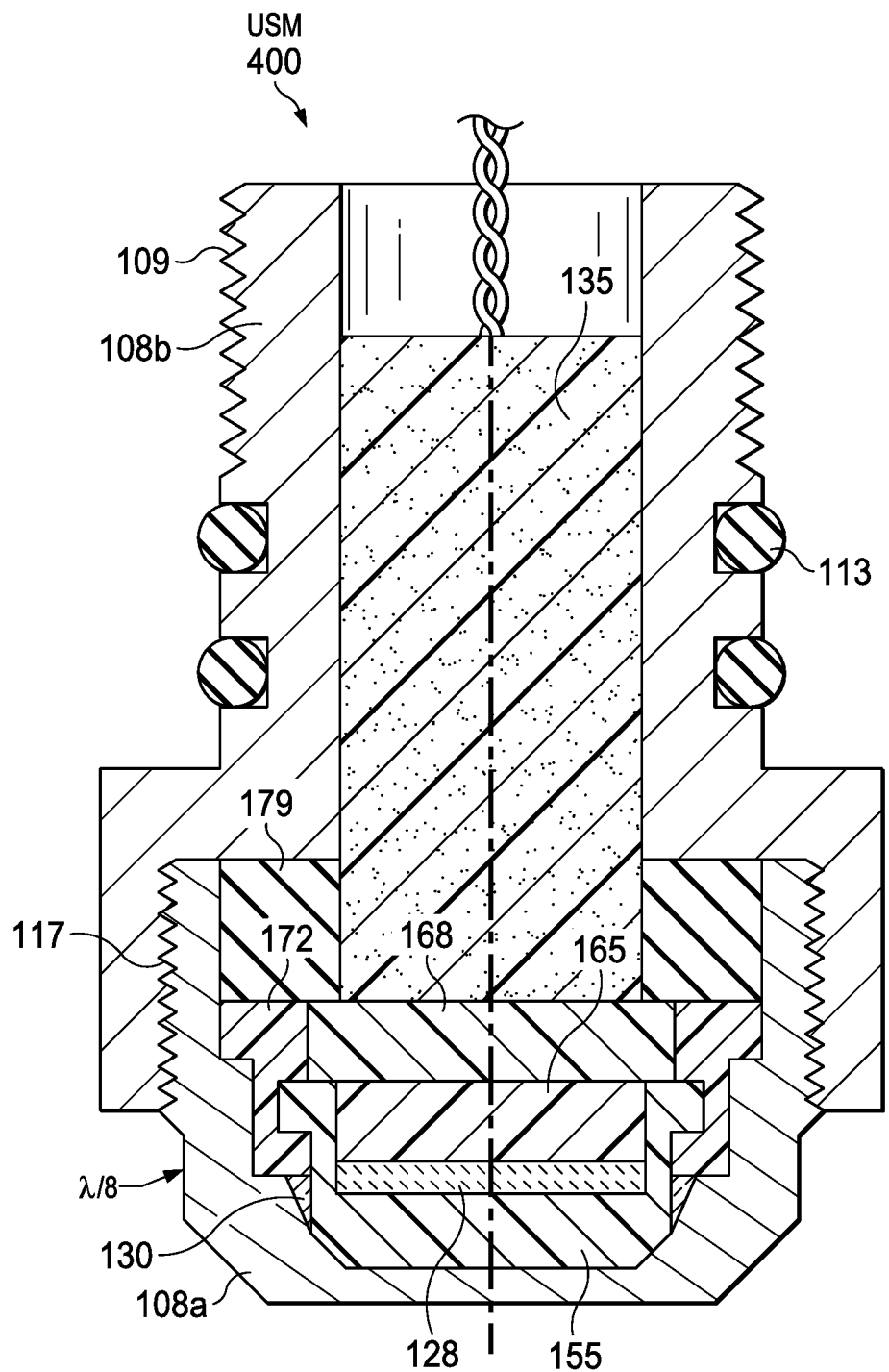
FIG. 4 shows a cut-away view of an example USM having a refocusing lens and a half-wavelength lens, with an outer housing variant, according to an example embodiment. The USM shown has a large internal space filled with a damping material.

The refocusing lens 130 and the second lens 140 are thus for redirecting received radial ultrasonic waves and to prevent multiple reflections within the walls of the lower housing portion 108b. The refocusing lens 130 and second lens 140 will redirect the received radial ultrasonic waves in the axial direction towards its counterpart piezoelectric element in the piezoelectric element pair. FIG. 4 shows a cut-away view of an example USM 400 with an outer housing having a refocusing lens 130 and a second lens 140. The region shown as 179 is a fastener, such as comprising a heady-duty rubber ring.

Figure 5:
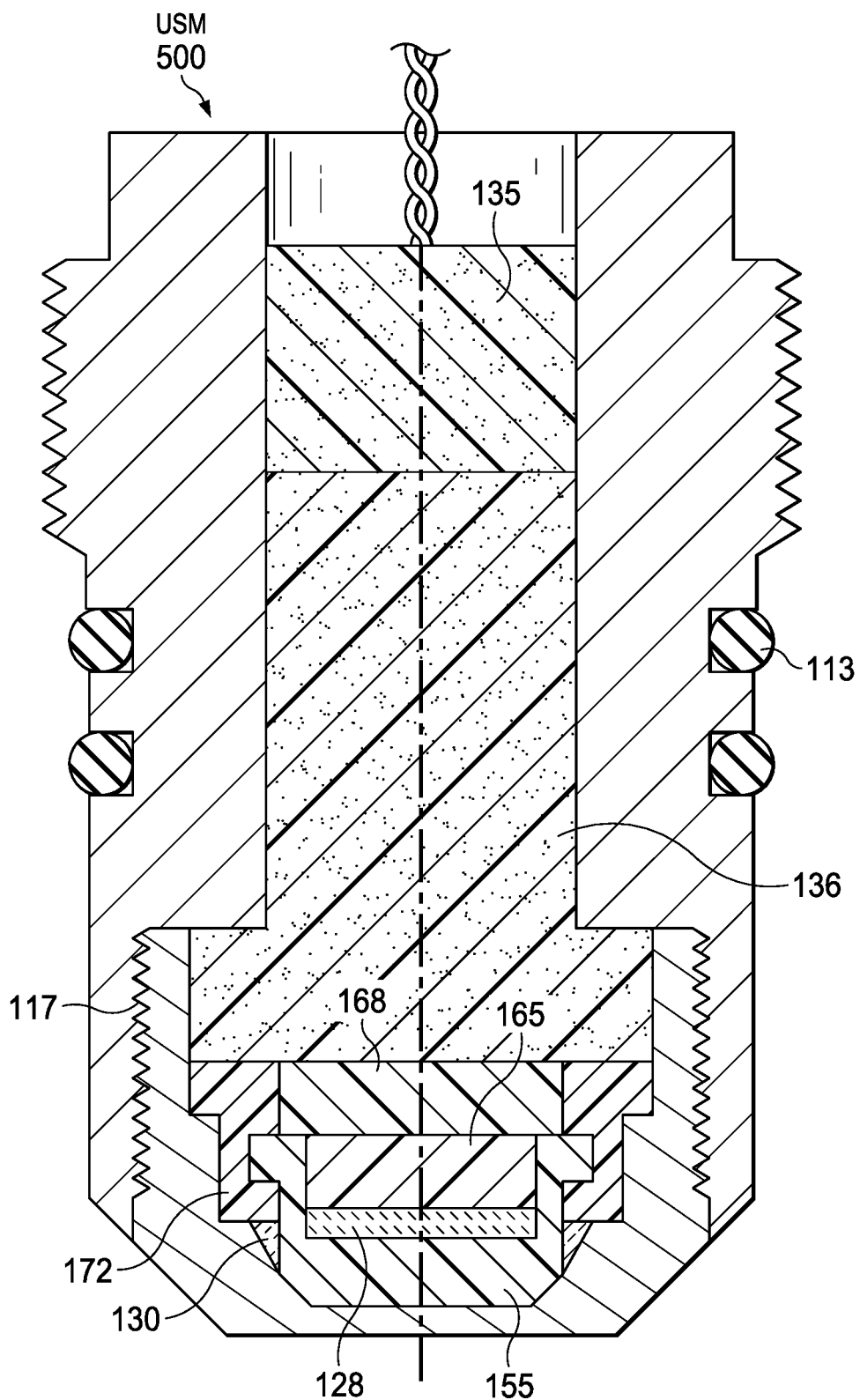
FIG. 5 shows a cut-away view of an example USM having a refocusing lens and a second lens, showing yet another outer housing variant, according to an example embodiment.

FIG. 5 shows a cut-away view of an example USM 500 having a refocusing lens 130 and a second lens 140, with an outer housing variant, according to an example embodiment. The variation in the outer housing shown eliminates the external step such as shown in FIGS. 3 and 4, now in FIG. 5 being a straight cylinder, and the internal rear structure comprising back filling and damping materials 135 and 136 can comprise epoxy resin, or room temperature vulcanizing (RTV) rubber. The back filling and damping material 136 between the back filling and damping material 135 and damping and cancelling layer 168 is used to better fill the back filling and damping material 135 and reduce the back-signal coupling. The back filling and damping materials region 136 may be pre-formed, such as comprising rubber.

In summary, the main features for disclosed USMs for addressing USM signal quality degrading factors are:

1. The lens combination including the refocusing lens 130 together with the second lens 140 in the lower housing portion 108b both radially outside the piezoelectric element redirects radial ultrasonic waves with an inflection slope and with diffraction/inflection in the axial direction to overcome mismatching of the generally metal comprising lower housing portion 108b to the fluid in the pipe which may have a large difference in impedance. The acoustic impedance is product of material density and sound velocity. Conventionally, a so-called matching layer of thickness ¼λ is used where for disclosed USM's the refocusing lens 130 and the second lens 140 are placed besides a conventional ¼ matching layer indicated as matching and temperature insulation layer 155 in FIGS. 3-5), and the impedance ratio of the matching layer is $Z_m = \sqrt{Z_c \cdot Z_p}$, where Zc is the acoustic impedance of the piezoelectric element 128, Zp is the acoustic impedance of the fluid medium. For example, if Zc=35 MRayl, and Zp=0.0004 MRayl (the Zp value for air), Zm is approximately equal to 0.11 MRayl in order to have good impedance match to air (the impedance of natural gas is approximately 1.3 larger than air at the same pressure and density) fluid, but it is difficult for solid and rigid materials to achieve such an impedance ratio. A disclosed refocusing lens 130 together with a disclosed second lens 140 can solve this problem.

2. The encapsulating chamber 129 that encapsulates the piezoelectric element 128 maximizes forward ultrasonic radiation efficiency while withstanding fluid pressure. The encapsulating chamber 129 can comprise a foam material. Alternatives to foam include polymers, epoxy, or generally any type of material with a close matching impedance to the impedance of the piezoelectric element 128 and relative to the air.

3. The wall of the lower housing portion 108b can have a wall thickness of λ/8±15% (shown in FIGS. 2 to 4) for cancelling standing waves and to also redirect (partial) reflections in a designated angle (e.g., calculated angle and tolerance (range)), such as 45 degrees±5 degrees.

4. The temperature insulation layer 155 is generally a composite material with a low thermal conductivity for protecting the conventional crystal material of the piezoelectric element (−20° C. to +60° C.) when the piezoelectric element 128 comprises a piezoelectric crystal, from large temperature variations that may exist in the field, e.g., −40° C. to +85° C.

5. The piezoelectric element 128 which as described is generally disc-shaped can comprise a ceramic material with a relatively large diameter-to-thickness ratio of >10 specially configured for radial mode vibration to increase its efficiency while reducing multiple modes. This provides high system sensitivity and signal efficiency enabling the use of a low voltage to more easily meet intrinsic safety requirements and being designed for being battery driven by providing low power consumption.

6. A special arrangement of screwing on the inner or outer wall, comprising something together with a wiring pin to a printed circuit board (PCB) of signal excitation and reception circuitry. The piezoelectric element 128 and PCB are generally connected by cable, with a positive, negative, and ground terminal. When performing the adding of the filling material from the back side of the back filling and damping material 135 there will generally be a negative pressure created so that it may be difficult to push the back filling and damping material 135 into the housing, if the material has paste form or is in liquid form, it may be even more difficult because of bubbles inside. Having the housing in two parts (upper and lower portions as shown as 108a and 108b in FIG. 1A, 1B and FIG. 3) makes the back filling and damping material 135 filling process easier and more controllable and flexible to mitigate possible back coupling as well.

An example assembly sequence to fabricate a disclosed USM is now provided. In a first step the piezoelectric element 128 can be bonded to a temperature insulation layer 155 which lines a lower housing portion 108b, thus being above the second lens 140, which is one of the core assembly steps, generally requiring special attention to operating conditions such as the temperature, preload, dust, and static. In a second step, the damping layer 165 while in is liquid form can be poured on top of the piezoelectric element 128. In a third step, the above-described components can be assembled with the side damping layer 172, and the damping and cancelling layer 168 while liquid form can be then poured in.

In a fourth step, the above components can be assembled within the lower housing portion 108b, which is one of the core assembly steps, and requires special attention to the bottom and side coupling, such as paying attention to the joint completely fitting, leaving no air gaps, such as using the matching and temperature insulation layer 155 to fill the gap. A fifth step can comprise assembling the upper housing 108a to the lower housing portion 108b, shown above as chamber connecting threads 117. In a sixth step, the back filling and damping material 135 while liquid form can be poured into the housing, paying attention to the cable in the middle position and the bonding well. In the sixth step, the liquid material will be converted to solid, as described above, while avoiding bubbles.

While various disclosed embodiments have been described above, it should be understood that they are presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. An ultrasonic flow meter, comprising:
an outer housing having an upper housing portion attached to a lower housing portion, with the upper housing portion having an attachment feature for attaching to a pipe that is adapted for having a fluid flowing therein;
at least a first piezoelectric element having a planar surface that defines a horizontal plane coupled to a transmitter and to a receiver, wherein the first piezoelectric element is configured to emit ultrasonic waves at an operating wavelength ($\lambda$) in an axial direction which is perpendicular to the horizontal plane;
a lens combination in the lower housing portion, including:
a refocusing lens positioned radially outside the first piezoelectric element that is ring-shaped configured for redirecting received radial ones of the ultrasonic waves to travel in the axial direction for reducing a signal loss that has a thickness profile configured to act as a matching layer for reducing multiple reflections within the lower housing portion,
a second lens that is flat disc-shaped positioned below the refocusing lens that includes an outer portion which is radially outside the first piezoelectric element configured for redirecting the radial ones of the ultrasonic waves to travel in the axial direction, and
a matching and temperature insulating layer comprising a composite material that is positioned between the first piezoelectric element and the refocusing lens and the second lens.

2. The ultrasonic flow meter of claim 1, further comprising an inner encapsulating chamber, wherein the first piezoelectric element, and the refocusing lens, are both within the encapsulating chamber.

3. The ultrasonic flow meter of claim 2, further comprising a backing and filling material comprising a polymer material above the encapsulating chamber for providing acoustic damping, canceling and sealing.

4. The ultrasonic flow meter of claim 3, further comprising a damping and canceling layer comprising a polymer between the backing and filling material and the first piezoelectric element.

5. The ultrasonic flow meter of claim 1, wherein the first piezoelectric element is disc-shaped, and wherein the lower housing portion has a wall region angled at 45°±5 degrees relative to the horizontal plane with a thickness of $\lambda/8+/-20\%$.

6. The ultrasonic flow meter of claim 1, wherein the first piezoelectric element comprises a piezoelectric ceramic that is disc-shaped which has a diameter to thickness ratio of at least 10.

7. The ultrasonic flow meter of claim 1, wherein the housing comprises brass, titanium, or an aluminum alloy.

8. The ultrasonic flow meter of claim 1, wherein the second lens utilizes of a bottom section of the lower housing portion.

9. The ultrasonic flow meter of claim 1, wherein the second lens has a center diameter of $\lambda/2\pm20\%$.

10. The ultrasonic flow meter of claim 1, further comprising a controller that has an associated memory, wherein the controller is coupled to the transmitter and to the receiver.

11. A method of ultrasonic fluid flow sensing, comprising:
providing an ultrasonic flow meter including a housing having an upper housing portion attached to a lower housing portion, with the upper housing portion having an attachment feature attached to a pipe for having a fluid flowing therein, wherein the ultrasonic flow meter includes at least a first piezoelectric element having a planar surface that defines a horizontal plane coupled to a transmitter and to a receiver, a lens combination lenses in the lower housing portion including a refocusing lens that is ring-shaped positioned radially outside the first piezoelectric element, and a second lens that is flat disc-shaped positioned below the refocusing lens including an outer portion that is radially outside the first piezoelectric element, and a matching and temperature insulating layer comprising a composite material that is positioned between the first piezoelectric element and the refocusing lens and the second lens;

the transmitter forcing the first piezoelectric element to emit ultrasonic waves at an operating wavelength (k) in primarily an axial direction which is perpendicular to the horizontal plane;

wherein the refocusing lens is configured for redirecting received radial ones of the ultrasonic waves to travel in the axial direction for reducing a signal loss and has a thickness profile configured to act as a matching layer for reducing multiple reflections within the lower housing portion, and wherein the outer portion of the second lens that is configured for redirecting the radial ones of the ultrasonic waves to travel in the axial direction.

12. The method of claim 11, wherein the first piezoelectric element is disc-shaped, and wherein the lower housing portion has a wall region angled at 45°±5 degrees relative to the horizontal plane and a thickness of $\lambda/8+/-20\%$.

13. The method of claim 11, wherein the ultrasonic flow meter further comprises a damping and canceling layer comprising a polymer between the backing and filling material and the first piezoelectric element.

14. The method of claim 11, wherein the first piezoelectric element comprises a piezoelectric ceramic that is disc-shaped which has a diameter to thickness ratio of at least 10.

15. The method of claim 11, wherein the refocusing lens has a triangular cross-section and wherein the second lens utilizes of a bottom section of the lower housing portion.

16. The method of claim 11, wherein a pressure of the fluid is 1 to 20 bar.

17. The method of claim 11, wherein the $\lambda$ is 10 mm to 30 mm.

18. The method of claim 11, wherein the ultrasonic flow meter further comprises a controller that has an associated memory, where the controller is coupled to the transmitter and to the receiver, further comprising switching roles of the transmitter and the receiver in designated timing intervals.

* * * * *